July 13, 1943.   A. N. MILSTER   2,324,412
BRAKING SYSTEM FOR TRACTOR VEHICLES
Filed Sept. 3, 1940   2 Sheets-Sheet 1
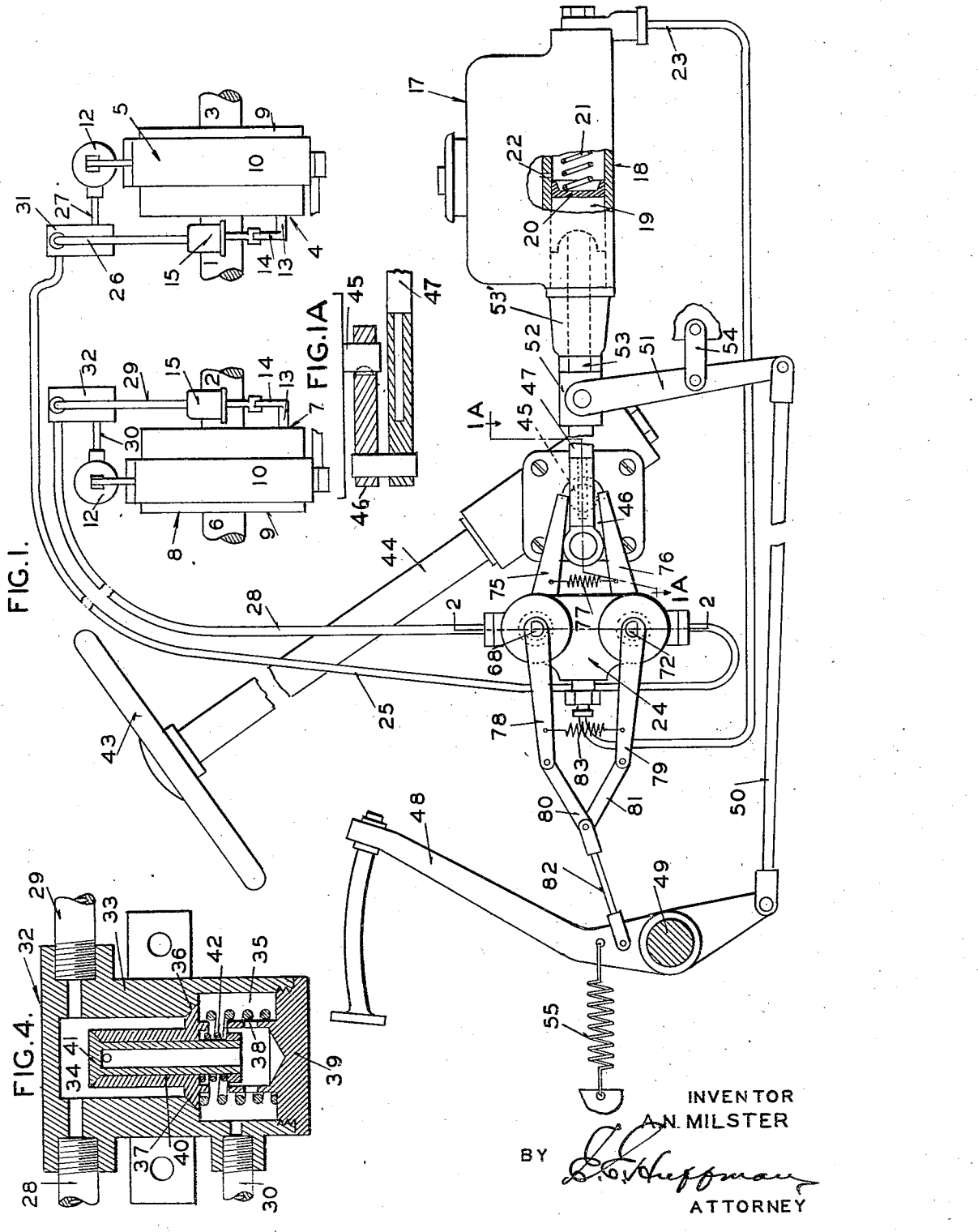
INVENTOR
A. N. MILSTER
BY
ATTORNEY July 13, 1943.   A. N. MILSTER   2,324,412
BRAKING SYSTEM FOR TRACTOR VEHICLES
Filed Sept. 3, 1940   2 Sheets-Sheet 2
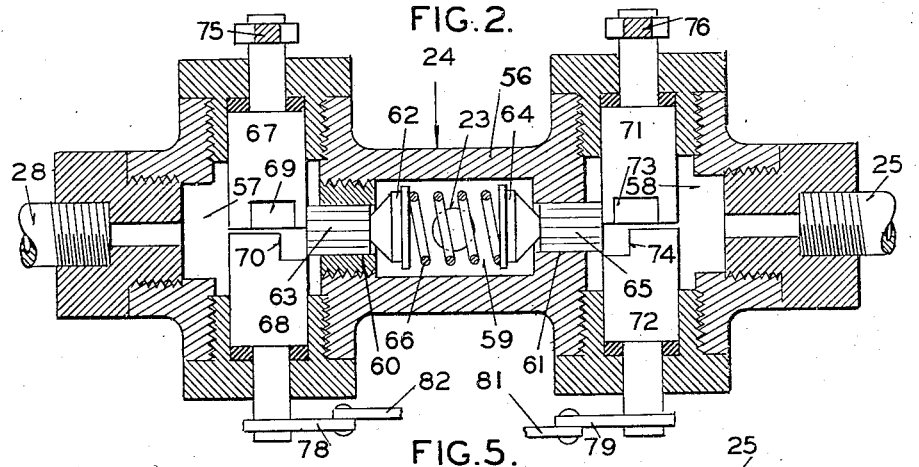
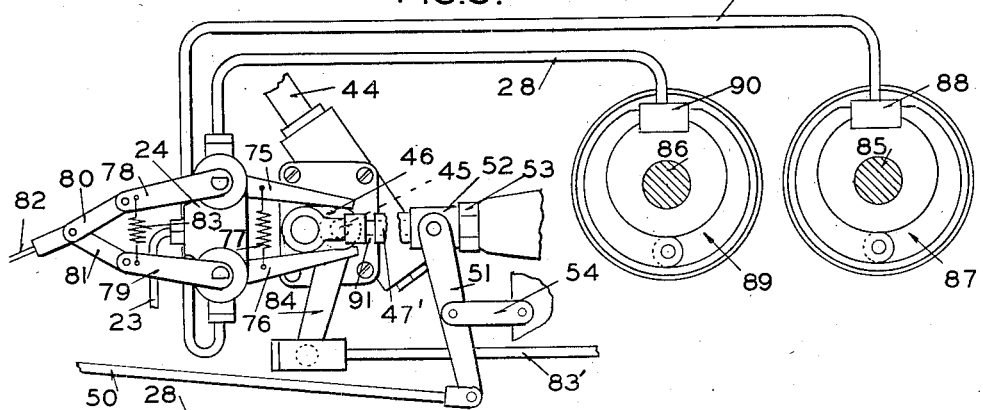
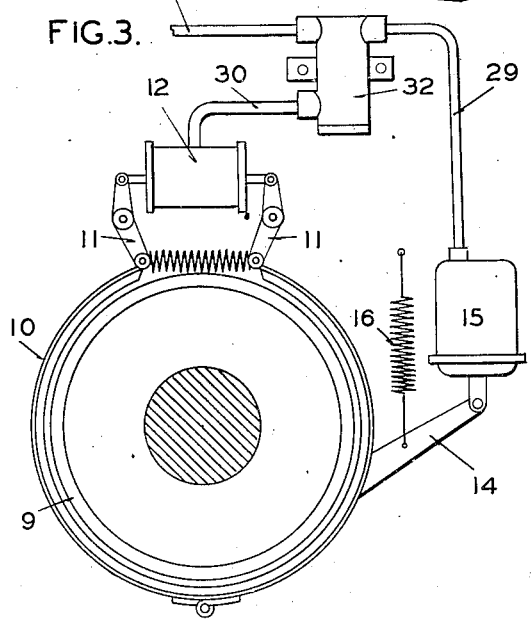
INVENTOR
A.N. MILSTER
BY
ATTORNEY Patented July 13, 1943

2,324,412

UNITED STATES PATENT OFFICE 2,324,412

BRAKING SYSTEM FOR TRACTOR VEHICLES

Arthur N. Milster, Ferguson, Mo., assignor to Wagner Electric Corporation, St. Louis, Mo., a corporation of Delaware Application September 3, 1940, Serial No. 355,147

15 Claims. (Cl. 180—17)

My invention relates to brakes and more particularly to a braking system for tractor vehicles which can be employed in steering the same.

One of the objects of my invention is to provide a fluid pressure braking system for a tractor vehicle which can be controlled and actuated by a single member so as to selectively cause either of the two brakes to be applied.

Another object of my invention is to provide a combined clutch disengaging and brake applying system for a tractor vehicle to thereby facilitate the steering thereof, said system being controlled by a single member such as a steering wheel.

Still another object of my invention is to provide a fluid pressure system for a tractor vehicle which will permit the operator by the operation of a single member to first disconnect a driving member of the vehicle and then subsequently apply a brake thereto to thereby cause the tractor to change its direction of travel.

A further object of my invention is to provide a fluid pressure braking system for two driving members of a tractor vehicle that will permit the operator to selectively apply the brakes by means of a single rotatable member or to simultaneously apply both brakes by means of another member.

Other objects of my invention will become apparent from the following description taken in connection with the accompanying drawings in which Figure 1 is a schematic view of a braking system embodying my invention and adapted for association with a tractor vehicle of the endless track laying type; Figure 1A is a sectional view taken on the line 1A—1A of Figure 1; Figure 2 is a sectional view taken on the line 2—2 of Figure 1 showing the control valve mechanism; Figure 3 is a side view of a brake and clutch associated with one of the driving members and showing the fluid pressure actuating controls; Figure 4 is a sectional view of the pressure-controlled valve; and Figure 5 is a schematic view of a braking system similar to the one shown in Figure 1 but adapted for use with a tractor vehicle having two rear driving wheels and a forward dirigible wheel controlled by a hand wheel steering mechanism.

Referring in details to Figures 1 to 4 and particularly to Figure 1, the braking system shown is adapted for association with a vehicle of the endless track laying type such as a farm or road tractor or a tank. In this type of vehicle the shafts 1 and 2 are driven from the engine or engines by means of a propeller shaft (not shown). In axial alignment with shaft 1 is a shaft 3 for driving the endless track on the right hand side of the vehicle. Between shafts 1 and 3 is a clutch 4 for disconnecting the track from the source of power and associated with shaft 3 is a brake generally indicated at 5 for retarding or holding the endless track driven by shaft 3. Similarly there is a shaft 6 in axial alignment with shaft 2 for driving the endless track on the left hand side of the vehicle. These shafts can be disconnected by a clutch 7 and a brake 8 is associated with shaft 6 for retarding or holding the endless track driven thereby. It is by means of the clutch and brakes just referred to that the vehicle is steered and controlled. If it is desired to steer the vehicle to the right, clutch 4 is disengaged and the brake applied, and if it is desired to steer the vehicle to the left, clutch 7 is disengaged and brake 8 applied. If the vehicle is to be stopped, both clutches are disengaged and both brakes applied. In accordance with my invention I provide an improved fluid pressure-actuated system for controlling the clutches and the brakes in the desired manner to thus facilitate the control of the vehicle.

The brakes 5 and 8 and the clutches 4 and 7 are of like construction. Referring to Figure 3, wherein the clutch 7 and brake 8 are shown, a drum 9 is secured to the endless track driving shaft and has associated therewith an engageable friction band 10. Levers 11 are connected to the end of the band and a fluid motor 12 actuates the levers to contract the band and engage it with the drums. The clutch 7 (not shown in detail) is housed with drum 9 and cooperates therewith to connect the shafts together. The clutch is actuated by a shaft 13 to which is secured an arm 14. This arm and the shaft are rotated by a fluid motor 15 to disengage the clutch against the bias of a spring 16 which normally holds the clutch engaged.

The fluid pressure source for operating the fluid motors of the clutches and brakes is shown as a master cylinder although other fluid pressure sources can be employed if desired. The master cylinder 17 is of known construction and comprises a cylinder 18 in which is reciprocable a piston 19 having a packing cup 20. A spring 21 normally holds the piston retracted where it uncovers a port 22 for placing the reservoir in communication with the cylinder to permit contraction and expansion of the fluid. The outlet of the master cylinder is connected by a conduit 23 to a valve mechanism 24 to be later described. From this valve mechanism a conduit 25 and branch conduits 26 and 27 lead to the fluid motors 12 and 15 of the right hand clutch 4 and the brake, and a conduit 28 and branch conduits 29 and 30 lead to the fluid motors 15 and 12 of the left hand clutch 7 and brake 8.

Between conduit 25 and branch conduits 26 and 27 is a pressure-controlled valve mechanism 31 and between conduit 28 and branch conduits 29 and 30 is a similar pressure-controlled valve mechanism 32. The purpose of each of these valve mechanisms is to cause each clutch fluid motor to be actuated prior to the brake fluid motor when fluid under pressure is transmitted from the master cylinder.

The valve mechanism 32 is shown in detail in Figure 4 and comprises a casing 33 provided with a stepped bore forming chambers 34 and 35 and a valve seat 36. Chamber 34 is connected to the main conduit 28 and branch conduit 29 leading to the clutch fluid motor 15 and chamber 35 is connected to branch conduit 30 leading to brake fluid motor 12. The valve seat 36 has cooperating therewith a valve element 37 held in seated position by a relatively strong spring 38 interposed between the valve element and closure plug 39. This valve element has a tubular passage 40 in which is mounted a second valve element 41 for closing the passage. A very light spring 42 maintains the valve element 41 seated so that fluid pressure can only pass from chamber 34 to chamber 35 by unseating valve element 37 against the bias of spring 38. Fluid can flow freely in the opposite direction by unseating valve element 41 against the light spring 42.

In the valve structure just described, spring 38 is of sufficient strength to maintain valve element 37 seated against a sufficient pressure to operate the clutch fluid motor. Thus when fluid under pressure is transmitted from the master cylinder through conduit 28, the clutch will be first disengaged, the valve element 37 unseated, and then the brake applied. This causes power from the tractor engine to be disconnected from the endless track and said track held from being moved by application of the brake.

Referring again to Figure 1 and also to Figure 1A, one of the means employed for actuating the master cylinder device is an ordinary steering wheel 43 mounted on a steering column 44. A shaft 45 is rotated by means of suitable gearing (not shown) at the base of the steering column and secured to this shaft arm 45 is a crank-arm 46. The outer end of this arm is pivotally connected to piston rod 47 to move piston 19 of the master cylinder forward to create fluid pressure said piston rod being connected to the piston by the usual ball and socket connection. When the crank-arm 46 and piston rod 47 are parallel with each other, as shown in Figure 1, piston 19 will be in its retracted position. If wheel 43 is turned in either direction, it will cause the piston to be moved forwardly.

In addition to the mechanism just described for reciprocating the master cylinder piston, there is also provided a brake pedal 48. This pedal is pivotally mounted on a suitable support by pivot 49 and is connected at its lower end by link 50 to the lower end of a lever 51. The other end of lever 51 is pivotally connected to a collar 52 slidably mounted on piston rod 47 and capable of abutting a shoulder 53 on the rod situated just rearwardly of the usual master cylinder flexible boot 53'. The intermediate portion of layer 51 is pivotally connected to a suitable support by a link 54. When the brake pedal 48 is depressed, the piston rod and piston will be moved forwardly to cause the master cylinder to place fluid under pressure and force it through outlet conduit 23. In order that the piston, when operated by the brake pedal will be free to move forward without interference by the crank-arm 46, the piston rod is made in two parts having telescopic relationship as shown. Since sleeve 52 is slidable on the piston rod, the piston rod may be moved by the steering wheel without interference by the mechanism operated by the brake pedal. The brake pedal is normally held in inoperative position by a suitable spring 55.

The previously referred to valve mechanism 24 has for its purpose the provision of means for selectively preventing fluid under pressure from entering either the conduits 25 or conduit 28 as desired. This valve mechanism is shown in detail in Figure 2 and comprises a casing 56 provided with end chambers 57 and 58 and an intermediate chamber 59 in communication with the end chambers by passages 60 and 61. The end chamber 57 is connected to conduit 28 and the end chamber 58 is connected to conduit 25. The intermediate chamber is connected to conduit 23 leading from the master cylinder. Fluid under pressure is prevented from flowing from the intermediate chamber 59 to end chamber 57 by a valve element 62 having a fluted stem 63 extending through passage 60. Similarly, a valve element 64 is employed to prevent fluid from flowing from the intermediate chamber 59 to end chamber 58, this valve element also being provided with a fluted stem 65 extending through passage 61. A spring 66 is interposed between the two valve elements in order to normally bias them toward a seated or closed position.

Within chamber 57 is positioned two axially aligned shafts 67 and 68 having portions extending to the exterior of the casing. The inner end of shaft 67 is provided with a flat surface 69 and the inner end of shaft 68 is provided with a similar flat surface 70. These flat surfaces, when presented toward stem 63 of valve element 62, permit the valve to be seated under the action of spring 66. If either shaft is so turned as to move its flat surface away from stem 63, the shaft surface will engage the stem and move valve element 62 away from its seat and permit fluid under pressure to pass from the intermediate chamber to end chamber 57.

The other end chamber 58 also has mounted therein two axially aligned shafts 71 and 72 having portions extending to the exterior of the casing. The inner end of shaft 71 is provided with a flat surface 73 and the inner end of shaft 72 is provided with a flat surface 74. These flat surfaces, when presented toward valve stem 65 permit valve 64 to be seated under the action of spring 66. If either shaft is rotated so that its flat surface is moved away from the valve stem, the valve stem will be engaged by the shaft surface and the valve unseated.

The shafts 67 and 71 extending to the same exterior side of the casing have secured thereto arms 75 and 76, respectively, which arms are positioned on opposite sides of the pivotal connection between the crank-arm 46 and the piston rod and arm held in abutting engagement with this connection by a spring 77. These arms are so related to their respective shafts and to the crank-arm that when the crank-arm is in its neutral position, as shown in Figure 1, the shafts will be in such position that the valves 62 and 64 will be held open. If the steering wheel 43 should be turned to the right (clockwise) so as to swing the crank-arm 46 in a counter-clockwise direction, arms 75 and 76 for controlling the shafts will be moved downwardly and cause the flat surface 69 on shaft 67 to be presented toward the valve stem. The valve 62 will now be permitted to assume a closed position. The valve 64 will remain open since the direction of rotation of shaft 71 will not cause surface 73 to be presented toward valve stem 65. Since the initial movement of the crank-arm will cause considerable movement of arms 75 and 76 without any great movement of the master cylinder piston, the valve 62 will be seated before the piston passes port 22 and any fluid pressure is built up. As the master cylinder piston builds up pressure by continued movement of wheel 43 to the right, this pressure will be transmitted only through conduit 25 to the fluid motors 12 and 15 controlling the right clutch 4 and brake 5, respectively, since valve 62 is closed and no fluid under pressure can be transmitted through conduit 28. As fluid under pressure is transmitted through conduit 25, it will first cause disengagement of the clutch and then engage the brake by operation of the fluid motor 12 due to the valve 31. Thus the right hand endless track will be held from moving and since power can still be applied to the left hand endless track, the tractor will be turned to the right in accordance with the turning of wheel 43 to the right.

If the steering wheel is turned to the left (counter-clockwise) the arms 75 and 76 will be moved upwardly by the crank-pin before fluid pressure is developed by the master cylinder. This movement of arms will result in valve 64 being closed so that fluid under pressure can be transmitted only from the master cylinder to conduit 28 to cause actuation of the fluid motors 12 and 15 of the brake 8 and clutch 7, respectively. Thus the left hand clutch will be first disengaged and then the left hand brake applied to prevent any movement of the left hand endless track. Since power can still be applied to the right hand endless track, the vehicle will be turned to the left in accordance with the direction of turning of the steering wheel 43.

Whenever it is desired to disengage both clutches and apply both brakes to stop the vehicle, such can be accomplished by depressing the foot pedal 48. In order to insure that both valves 62 and 64 will be open when the pedal is depressed, shafts 68 and 72 are connected to the brake pedal in such a manner that they will be turned to a position where their respective surfaces 70 and 74 will be away from the valve stems. The construction shown for accomplishing this comprises an arm 78 secured to the outer end of shaft 68 and an arm 79 secured to the outer end of shaft 72. Toggle links 80 and 81 connect the free ends of these arms to a link 82 which in turn is connected to the brake pedal. A spring 83 is connected to the arms to bias them toward each other. By this structure when pedal 48 is depressed, arms 78 and 79 are rotated away from each other and both shafts 68 and 72 will be turned to such position as to hold valves 62 and 64 open notwithstanding the condition in which the valves may be as the result of any position of the steering wheel. With the valves both held open, the fluid pressure developed by the master cylinder under the movement of the brake pedal will be transmitted through conduits 25 and 28 thereby causing disengagement of the clutches and then application of the brakes.

With a tractor vehicle of the endless track laying type equipped with the fluid pressure system described, it is very easy to properly control said vehicle. When it is desired to turn the vehicle to the right, all that is necessary is to turn the steering wheel to the right (clockwise). When it is desired to turn the vehicle to the left, all that is necessary is to turn the wheel to the left (counter-clockwise). In each case the desired endless track is disconnected from the source of power and then braked. If at any time it is desired to disconnect both endless tracks from the source of power and brake them to stop the vehicle, all that is necessary is to depress the brake pedal.

My improved fluid pressure system may also be employed on a tractor vehicle of the type in which there are two driven wheels and a dirigible wheel or wheels for steering. Such an adaptation is shown in Figure 5 wherein like reference characters represent structure previously described. The dirigible wheels (not shown) of the vehicle are steered by the steering wheel on the steering column. The mechanical steering mechanism is connected to shaft 45 of the steering column by a drag link 83' and an arm 84. The axles for driving the two driving wheels from the engine are shown at 85 and 86. The right axle 85 has associated therewith a brake 87 actuated by a fluid motor 88 connected to conduit 25. The left axle 86 has associated therewith a brake 89 actuated by a fluid motor 90 connected to conduit 28. The telescoping two part piston rod 47' for actuating the master cylinder is constructed so as to have a lost motion 91 in order that the crank-arm 46 and steering control arm 84 can be moved a limited extent without moving the master cylinder piston. This permits the dirigible wheels to be normally steered without the possibility of applying pressure to either of the brakes.

The master cylinder will only be actuated when the steering wheel is so rotated as to make a short turn with the vehicle. When this occurs the brake on the side of the vehicle corresponding to the direction in which the vehicle is being turned, will be applied since the valve controlling the conduit leading to the other brake will be closed. By means of this type of braking, the short turning of the vehicle will be assisted and without any special operation of the operator since it is done automatically with the turning of the steering wheel. When it is desired to apply both brakes simultaneously to stop or retard the vehicle, all that is necessary is to depress the brake pedal. Since both valves in valve mechanism 24 will be positively held open under these conditions, the position of the steering wheel will be of no consequence.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking and steering mechanism, two members adapted to be driven from a source of power, a clutch for disconnecting each member from its power source, a brake for each member, means for disengaging both clutches and for subsequently applying both brakes, a single manually-operated member for controlling said means, means for so conditioning the first named means that the clutch and brake associated with one member only will be caused to be respectively disengaged and applied, and means comprising a member operable independently of the single manually-operated member for operating the conditioning means and for also causing the clutch and brake of the one member to be respectively disengaged and applied.

2. In braking and steering mechanisms, two members adapted to be driven from a source of power, means for disconnecting each member from its power source, a brake for each member, means for first operating the disconnecting means of each member and then applying the brake thereof, a single operator-operated means for controlling said means, means for so conditioning the first named means that the disconnecting means and brake associated with one member only will be operated, and means comprising a second manually-controlled member for operating the conditioning means and for also causing the disconnecting means and the brake of said one member to be operated.

3. In braking and steering mechanism, two members adapted to be driven from a source of power, means for disconnecting each member from its source of power, a brake for each member, fluid pressure operated means comprising a single source of pressure and a control means therefor for first substantially simultaneously operating the disconnecting means for both members and subsequently applying the brakes thereof, means for preventing fluid under pressure from the pressure source from being transmitted to operate the disconnecting means and to apply the brake of either one of said members, and operator-operated means independent of said control means for operating the last named means and also controlling the source of fluid pressure.

4. In braking and steering mechanism, two members adapted to be driven from a source of power, a clutch for disconnecting each member from its power source, a brake for each member, fluid pressure actuated means including a source of fluid pressure and control means for first engaging both clutches and subsequently applying both brakes, a shut-off valve for preventing the clutch and brake associated with each of said members from being disengaged and applied when the fluid pressure means is operated, and manually-controlled means operable independently of said control means for selectively operating the shut-off valves and also controlling the source of fluid pressure.

5. In braking and steering mechanism, two members adapted to be driven from a source of power, a clutch for disconnecting each member from its source of power, a brake for each member, a source of fluid pressure, individual fluid motors for each clutch and each brake, conduit means for connecting the source with the fluid motors of the clutch and brake associated with one member, conduit means for connecting the source with the fluid motors of the clutch and brake associated with the other member, pressure-controlled valve means for causing the clutch associated with each member to be disengaged prior to the application of the brake thereof when fluid pressure is transmitted from said source, a shut-off valve associated with each conduit means, and manually operable means for selectively closing the shut-off valves whereby fluid under pressure can be prevented from operating the clutch and brake of either one of the members.

6. In braking and steering mechanism, two members adapted to be driven from a source of power, a clutch for disconnecting each member from its power source, a brake for each member, fluid pressure-operated means comprising a master cylinder for first disengaging both the clutches and subsequently applying both the brakes, a shut-off valve for preventing the clutch and brake associated with each of said members from being disengaged and applied when the master cylinder is operated, and a single manually-operated member for selectively causing the closing of either shut-off valve and then subsequently operating the master cylinder.

7. In braking and steering mechanism, two members adapted to be driven from a source of power, a clutch for disconnecting each member from its source of power, a brake for each member, a source of fluid pressure, individual fluid motors for each clutch and each brake, conduit means for connecting the source with the fluid motors of the clutch and brake associated with one member, conduit means for connecting the source with the fluid motors of the clutch and brake associated with the other member, pressure-controlled valve means for causing the clutch associated with each member to be disengaged prior to the application of the brake thereof when fluid pressure is transmitted from said source, a shut-off valve associated with each conduit means, manually operable means for selectively closing the shut-off valves whereby fluid under pressure can be prevented from operating the clutch and brake of either one of the members, and means operable by said manually operable means for controlling the pressure source after a shut-off valve has been closed.

8. In braking and steering mechanism for a vehicle, two driven members, a brake for each member including a fluid motor, a source of fluid pressure, conduits connecting the source with each brake fluid motor, a shut-off valve for disabling each brake fluid motor, a steering mechanism comprising a single manually-controlled member, means operable by said single manually-controlled member for selectively closing the shut-off valves by its movement in opposite directions from a central position during steering, and means for operating the pressure source by the manually-controlled member after either shut-off valve is closed to thereby cause fluid pressure to be effective in the fluid motor, the shut-off valve of which is open.

9. In braking and steering mechanism for a vehicle, two driven members, a brake for each member including a fluid motor, a source of fluid pressure, conduits connecting the source with each brake fluid motor, a shut-off valve for disabling each brake fluid motor, a steering mechanism comprising a single manually-controlled member, means operable by said single manually-controlled member for selectively closing the shut-off valves by its movement in opposite directions from a central position during steering, means for operating the pressure source by the manually-controlled member after either shut-off valve is closed, and a second manually-controlled member for operating the pressure source and for causing both valves to be open notwithstanding the position of the first manually-controlled member.

10. In braking and steering mechanism for a vehicle, two driven members, a brake for each member including a fluid motor, a master cylinder, conduits connecting the master cylinder with each brake fluid motor, a shut-off valve in each conduit for disabling the fluid motors, a steering mechanism comprising a single rotatable member having a central vertical position, means operable by said rotatable member for selectively closing the shut-off valves by its rotation in opposite directions from the vertical position during steering, and means for actuating the master cylinder by the rotatable member after either valve has been closed.

11. In braking and steering mechanism for a vehicle, two driven members, a brake for each member including a fluid motor, a master cylinder, conduits connecting the master cylinder with each brake fluid motor, a shut-off valve in each conduit for disabling the fluid motors, a steering mechanism comprising a single rotatable member having a central vertical position, means operable by said rotatable member for selectively closing the shut-off valves by rotation in opposite directions from the vertical position during steering, means for actuating the master cylinder by the rotatable member after either valve has been closed, a pedal for actuating the master cylinder, and means for causing both valves to be open when the master cylinder is actuated by the pedal notwithstanding the position of the rotatable member.

12. In braking and steering mechanism for a vehicle, two driven members, a brake for each member including a fluid motor, a source of fluid pressure, conduits connecting the source with each brake fluid motor, a shut-off valve for disabling each fluid motor of a brake, steering mechanism comprising a single manually-controlled member, means operable by said single manually-controlled member for selectively closing the shut-off valves by its movement in opposite directions from a central position and for controlling the pressure source, and manually-controlled means operable at will for causing a shut-off valve to be open notwithstanding the manually-controlled member of the steering mechanism may be in a position where said shut-off valve would be caused to be closed and for also operating said last named means.

13. In braking and steering mechanism for a vehicle, two driven members, a brake for each member including a fluid motor, a source of fluid pressure, conduits connecting the source with each brake fluid motor, a shut-off valve for disabling each brake fluid motor, steering mechanism comprising a single manually-controlled member, means operable by said single manually-controlled member for selectively closing the shut-off valves by its movement in opposite directions from a central position and for controlling the pressure source, and manually-controlled means operable at will for causing both shut-off valves to be open notwithstanding the member of the steering mechanism may be moved from its central position and for also operating said last named means.

14. In braking and steering mechanism for a vehicle, two driven members, a brake for each member including a fluid motor, a master cylinder, conduit means connecting the master cylinder with each brake fluid motor, shut-off valve means for preventing fluid under pressure from the master cylinder from being transmitted to either fluid motor, steering mechanism comprising a single manually-controlled member, means operable by said single manually-controlled member for selectively closing the shut-off valve means by its movement in opposite directions from a central position and for actuating the master cylinder, and manually-controlled means operable at will for opening a shut-off valve means when it is in closed position as a result of the member of the steering mechanism being moved from its central position and for also operating said last named means.

15. In braking mechanism for aiding in steering a vehicle, two driven members, a brake for each member including a fluid motor, a source of fluid pressure, conduit means connecting the source with each brake fluid motor, a shut-off valve associated with the conduit means leading to each fluid motor of a brake for disabling said fluid motor, a single manually-controlled member, means operable by said single manually-controlled member for selectively closing the shut-off valves by its movement in opposite directions from a central position and for controlling the pressure source, and other manually-controlled means operable at will for causing a shut-off valve to be opened notwithstanding the first named manually-controlled member may be in a position wherein the shut-off valve would be caused to be closed and for also operating said last named means.

ARTHUR N. MILSTER.